United States Patent
Sasaki et al.

(10) Patent No.: US 7,350,732 B2
(45) Date of Patent: Apr. 1, 2008

(54) CARTRIDGE CASE AND INFORMATION RECORDING MEDIUM

(75) Inventors: Morimasa Sasaki, Tokyo (JP); Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 423 days.

(21) Appl. No.: 11/151,254

(22) Filed: Jun. 14, 2005

(65) Prior Publication Data

US 2005/0274839 A1    Dec. 15, 2005

(30) Foreign Application Priority Data

Jun. 15, 2004  (JP)  ............... 2004-176325

(51) Int. Cl.
*G11B 23/107*  (2006.01)
(52) U.S. Cl. ...................... 242/348; 360/132
(58) Field of Classification Search ............... 242/343, 242/348, 348.2; 360/132
See application file for complete search history.

(56) References Cited

FOREIGN PATENT DOCUMENTS

| JP | 2001-202744 | 7/2001 |
|---|---|---|
| JP | 2002-343058 | 11/2002 |
| JP | 2003-022645 | 1/2003 |
| JP | 2004-039154 | 2/2004 |

OTHER PUBLICATIONS

English Language Abstract of JP 2001-202744.
English Language Abstract of JP 2002-343058.
English Language Abstract of JP 2003-022645.
English Language Abstract of JP 2004-039154.
U.S. Appl. No. 11/138,276 to Sasaki et al., filed May 27, 2005.

*Primary Examiner*—John Q. Nguyen
(74) *Attorney, Agent, or Firm*—Greenblum & Bernstein, P.L.C.

(57) ABSTRACT

A cartridge case includes a case main body, a tape reel that includes a hub in the shape of a bottomed-cylinder and is rotatably enclosed inside the case main body, and a locking member on whose base part ring-shaped first teeth are formed, which is energized toward an inner surface of a base plate of the hub, is enclosed within the case main body so as to be capable of moving in a direction toward and away from the base plate, and restricts rotation of the tape reel. The tape reel includes a plurality of arc-shaped convex parts that are disposed on a circle about an axis of the hub on the inner surface of the base plate and support the locking member that has moved toward the base plate. Second teeth that engage the first teeth are formed on an upper part of at least one of the convex parts. A contact surface that contacts edges of the first teeth without engaging the first teeth is formed on an upper part of at least one of the convex parts.

8 Claims, 8 Drawing Sheets

CARTRIDGE CASE AND INFORMATION RECORDING MEDIUM

BACKGROUND OF THE INVENTION

1. Field of the Invention

The present invention relates to a cartridge case including a tape reel with a hub in the shape of a bottomed cylinder and a locking member that prevents rotation of the tape reel, and to an information recording medium equipped with the cartridge case.

2. Description of the Related Art

The magnetic tape cartridge disclosed by Japanese Laid-Open Patent Publication No. 2002-343058 is known as one example of this type of information recording medium. This magnetic tape cartridge is constructed by enclosing a single reel (a tape reel), around which magnetic tape has been wound, inside a cartridge case. Three pairs of engaging protrusions are disposed at equal intervals on a circle on the upper surface of the base plate of the reel hub that constructs the reel, with locking teeth being respectively formed on the ends of these engaging protrusions. A locking member that is energized in a locking direction by an energizing member is also enclosed inside the cartridge case. Locking teeth that engage the locking teeth of the reel hub are formed in a ring in an outer circumferential part of a lower surface of the locking member. When this magnetic tape cartridge is not in use, the locking teeth of the locking member and the locking teeth of the reel hub are caused to engage and thereby lock the reel in a non-rotatable state.

Figure 13:
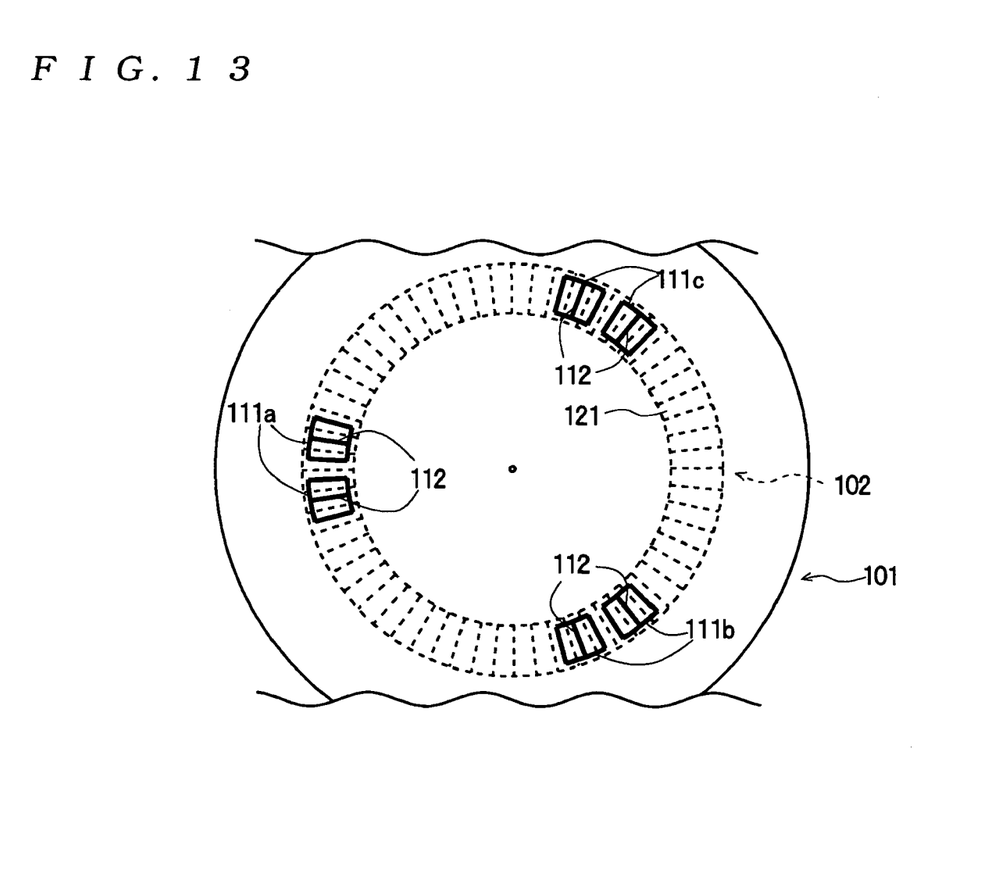
FIG. 13 is a plan view of a conventional reel hub and locking member.
Figure 14:
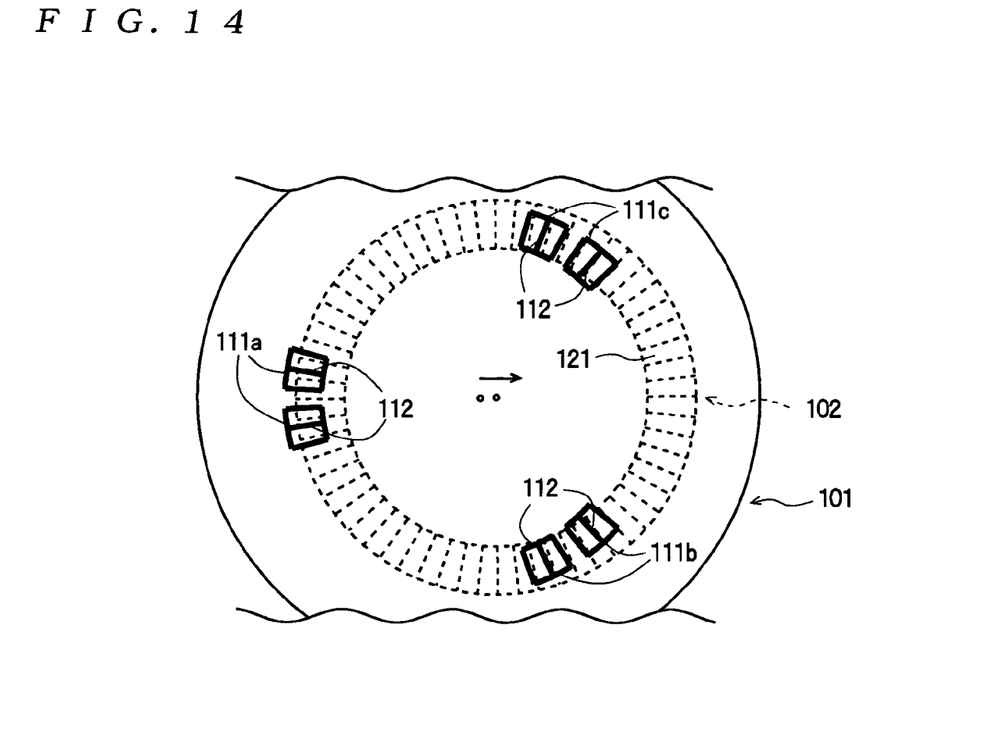
FIG. 14 is a plan view of the conventional reel hub and locking member in a state where the reel hub and the locking member are relatively displaced.
Figure 15:
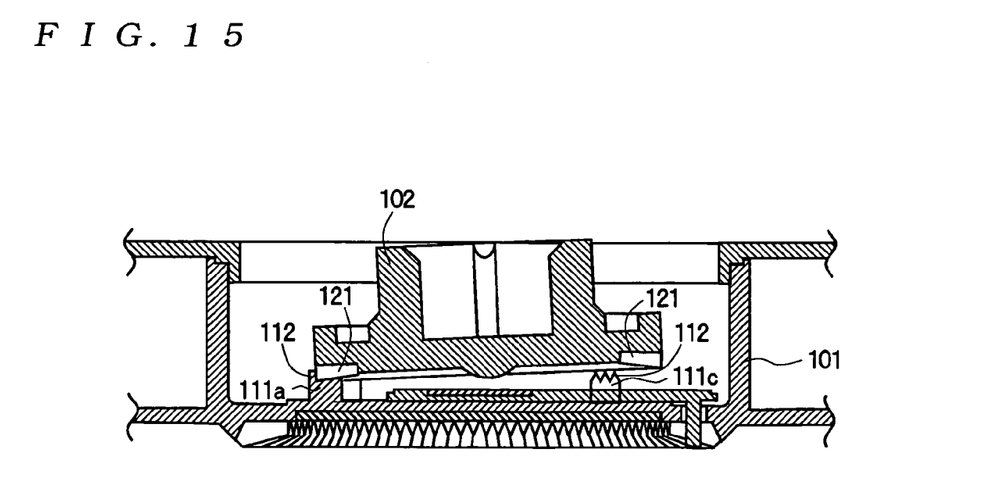
FIG. 15 is a cross-sectional view of the conventional reel hub and locking member.

By investigating the magnetic tape cartridge described above, the present inventors discovered the following problem to be solved. In this magnetic tape cartridge, as shown in FIG. 13, the engaging protrusions 111a, 111b, 111c (referred to hereinafter simply as the "engaging protrusions 111" when no distinction is required) of the reel hub 101 are disposed at equal intervals on a circle, with locking teeth 112 being formed on all of the engaging protrusions 111. That is, the locking teeth 112 of the engaging protrusions 111 are formed radially about the central axis of the reel hub 101, with the ridges of the respective locking teeth 112 being shown by the solid lines in FIG. 13. The locking teeth 121 of the locking member 102 are also formed radially about the central axis of the locking member 102, with the ridges of the respective locking teeth 121 being shown by the broken lines in FIG. 13. As shown in FIG. 13, when the central axis of the reel hub 101 is coincident or substantially coincident with the central axis of the locking member 102, the orientations of the ridges of the facing locking teeth 112, 121 match one another, so that the locking teeth engage and thereby lock the reel. On the other hand, in this type of magnetic tape cartridge, a predetermined clearance is provided between the reel and the cartridge case to allow the reel to rotate smoothly. This means that when the magnetic tape cartridge is used in an inclined state, for example, there are cases where the reel moves within the cartridge case by an amount equal to the clearance. When the reel (the reel hub 101) has moved in the direction of the arrow shown in FIG. 14 for example, (to the right in the drawing), since the ridges of the locking teeth 112, 121 are formed radially as described above, as shown in FIG. 14 and FIG. 15, the orientations of the respective locking teeth 112 of the engaging protrusions 111b, 111c no longer match the orientations of the ridges of the respective locking teeth 121. This results in the tops of the locking teeth 121 riding up onto the tops of the locking teeth 112 of the engaging protrusions 111b, 111c, so that the locking member 102 does not maintain a state that is parallel to the base plate of the reel hub 101 and becomes inclined, resulting in the locking teeth 112 and 121 not engaging one another. Accordingly, with this magnetic tape cartridge, when the reel and the locking member 102 become misaligned due to movement of the reel, the reel becomes incompletely locked and can rotate, resulting in the problem that the magnetic tape wound around the reel may become slack. Also, even if the respective locking teeth 112, 121 of the reel and the locking member 102 are in complete engagement, when an external force is applied to the magnetic tape cartridge, for example, and the reel moves so that the locking teeth 112, 121 become disengaged, there is still the problem of the reel becoming incompletely locked and therefore rotating.

SUMMARY OF THE INVENTION

The present invention was conceived in view of the problems described above and it is a principal object of the present invention to provide a cartridge case and an information recording medium that can reliably prevent rotation of the tape reel. It is another object to provide a cartridge case and an information recording medium where a state where rotation of the tape reel is prevented can be reliably maintained even when an external force or the like is applied.

To achieve the stated objects, a cartridge case according to the present invention includes: a case main body; a tape reel that includes a hub in the shape of a bottomed-cylinder and is rotatably enclosed inside the case main body; and a locking member on whose base part ring-shaped first teeth are formed, which is energized toward an inner surface of a base plate of the hub, is enclosed within the case main body so as to be capable of moving in a direction toward and away from the base plate, and restricts rotation of the tape reel, wherein the tape reel includes a plurality of arc-shaped convex parts that are disposed on a circle about an axis of the hub on the inner surface of the base plate and support the locking member that has moved toward the base plate, second teeth that engage the first teeth are formed on an upper part of at least one of the convex parts, and a contact surface that contacts edges of the first teeth without engaging the first teeth is formed on an upper part of at least one of the convex parts. An information recording medium according to the present invention includes this cartridge case.

According to the above cartridge case and information recording medium, second teeth are formed on at least one out of the plurality of convex parts disposed on a circle about an axis of the hub on an inner surface of a base plate of the hub, and a contact surface that contacts the edges of the first teeth of the locking member without engaging the first teeth is formed on at least one out of the convex parts. This means that when the locking member is moved toward the base plate of the hub, even if the hub and the locking member are somewhat displaced, unlike a conventional magnetic tape cartridge, the orientations of all the ridges of the second teeth of the hub and the orientations of all the ridges of the first teeth of the locking member that face the respective ridges can substantially match. Accordingly, it is possible to cause the first teeth and the second teeth to engage reliably. In this state, the edges of the first teeth can be caused to contact the contact surface formed on the convex parts, so that it is possible to support the locking member so as to be parallel (or substantially parallel) to the base plate of the hub. As a result, it is possible to reliably prevent rotation of the tape reel.

In this case, the at least one convex parts on which second teeth are formed may be disposed only in a fan-shaped region on the inner surface of the base plate with a central angle of 10 to 100° inclusive about the axis of the hub. With this construction, since it is possible to form a sufficient number of tops in the second teeth, it is possible to construct second teeth that reliably engage the first teeth with sufficient strength.

The tape reel may further include first positioning parts that are formed along edges on at least one of outer circumferential sides and inner circumferential sides of the convex parts so as to protrude further than edges of the second teeth, wherein in a state where the first teeth and the second teeth are in engagement, side surfaces of the first positioning parts contact or are proximate to a side surface on one of an outer circumferential side and an inner circumferential side of the first teeth and position the tape reel and the locking member. With this construction, it is possible to reliably restrict movement of the hub relative to the locking member in a plane perpendicular to the axis of the hub, so that even if an external force is applied to the cartridge case (information recording medium) when the cartridge case is not in use, it is still possible to maintain the state where the first teeth and the second teeth reliably engage one another.

The locking member may further include a second positioning part that is formed along an edge on at least one of an outer circumferential side and an inner circumferential side of the first teeth so as to protrude further than edges of the first teeth, wherein in a state where the first teeth and the second teeth are in engagement, a side surface of the second positioning part contacts or is proximate to side surfaces of the convex parts to position the tape reel and the locking member. With this construction, it is possible to reliably prevent movement of the hub relative to the locking member in a plane perpendicular to the axis of the hub, so that even if an external force is applied to the cartridge case (the information recording medium) when the cartridge case is not in use, for example, it is possible to maintain the state where the first teeth and the second teeth reliably engage one another.

It should be noted that the disclosure of the present invention relates to a content of Japanese Patent Application 2004-176325 that was filed on 15 Jun. 2004 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a cartridge case and an information recording medium according to the present invention will now be described with reference to the attached drawings.

First, the construction of a tape cartridge 1 (one example of an information recording medium according to the present invention) will be described with reference to the drawings.

Figure 1:
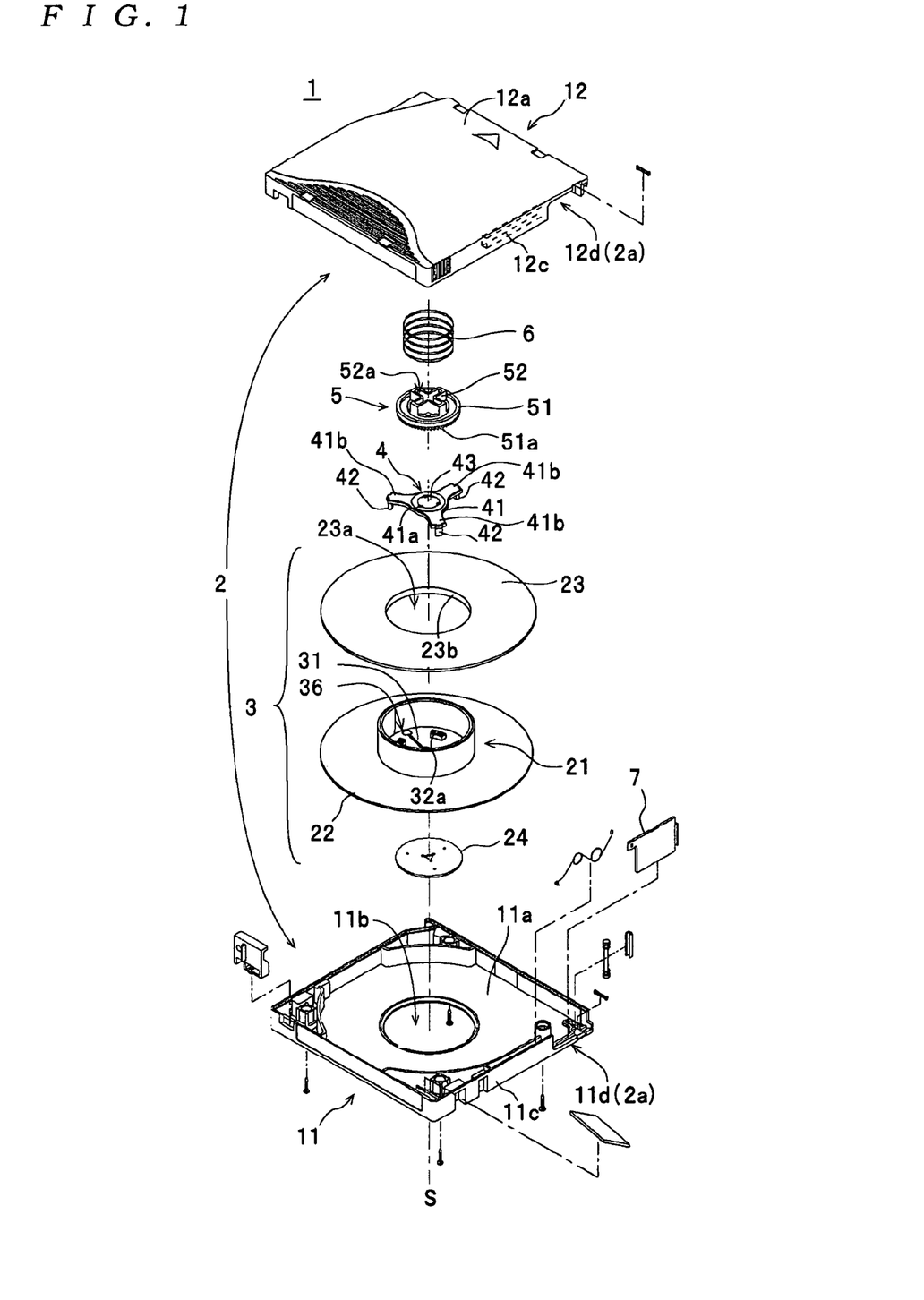
FIG. 1 is an exploded perspective view of a tape cartridge.

The tape cartridge 1 shown in FIG. 1 is a single-reel, cartridge-type information recording medium that is used as a storage device for backing-up recording data that has been recorded by a computer, for example. As shown in FIG. 1, the tape cartridge 1 includes a case main body 2, a tape reel 3, a brake releasing plate 4, a locking member 5, a spring 6, and a door member 7. A magnetic tape, not shown, is wound around the tape reel 3. Here, the component elements aside from the magnetic tape construct the cartridge case according to the present invention.

Figure 2:
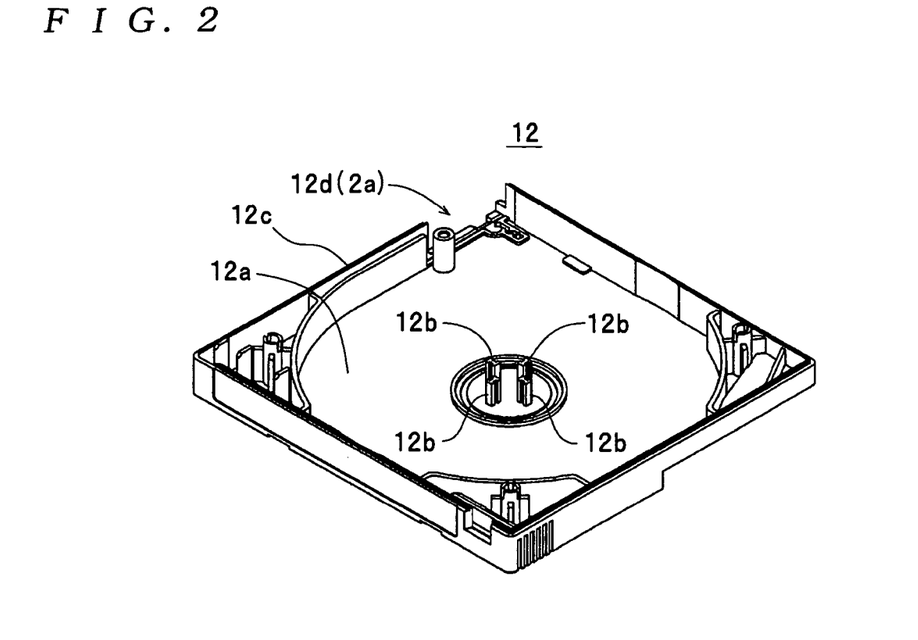
FIG. 2 is a perspective view of an upper case.

As shown in FIG. 1, the case main body 2 is constructed of a lower case 11 and an upper case 12 that are respectively formed in the shape of shallow plates and can engage one another. The case main body 2 encloses the tape reel 3 in an internal space formed when the upper case 11 and the lower case 12 engage one another so that the tape reel 3 is rotatable. Here, a circular opening 11b for allowing a drive shaft of a drive apparatus, not shown, to pass through is formed in a central part of a base plate 11a of the lower case 11. A cutaway part 11d which constructs a tape withdrawal opening 2a for withdrawing the magnetic tape wound around the tape reel 3 to the outside is formed in a side wall 11c of the lower case 11. On the other hand, as shown in FIG. 2, four guide protrusions 12b, which restrict rotation of the locking member 5 and hold the locking member 5 so that the locking member 5 can move up and down (i.e., the guide protrusions 12b guide the locking member 5 up and down) are formed in a central part of an inner surface of a top plate 12a of the upper case 12. A cutaway part 12d that together with the cutaway part 11d of the lower case 11 constructs the tape withdrawal opening 2a is formed in a side wall 12c of the upper case 12.

Figure 4:
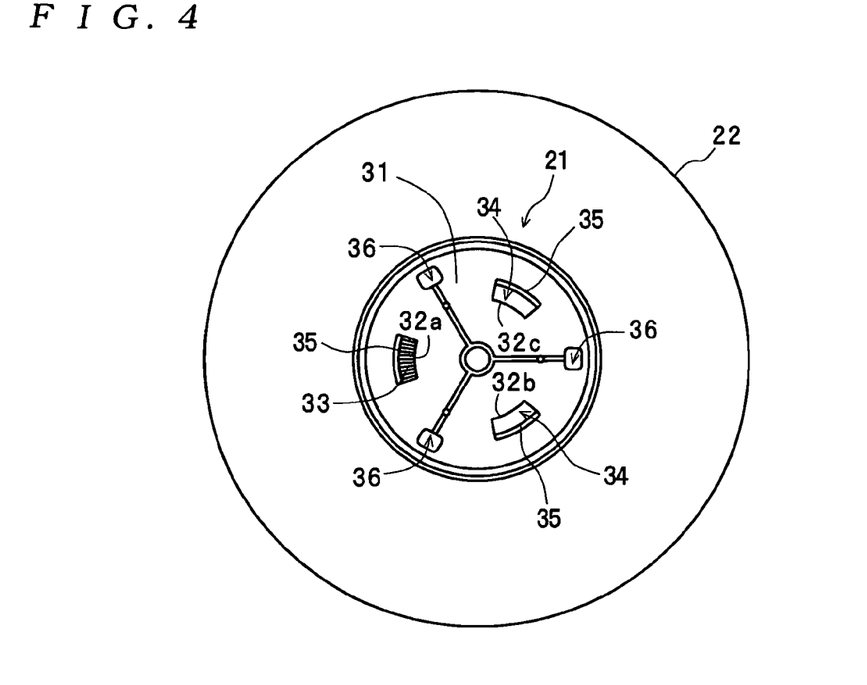
FIG. 4 is a plan view of a hub and a lower flange.

As shown in FIG. 1, the tape reel 3 includes a hub 21, a lower flange 22, and an upper flange 23. The hub 21 is shaped as a bottomed cylinder where an opening is formed at an upper end, and is constructed so that the magnetic tape can be wound around a circumference thereof. Also, as shown in FIG. 4, three (one example of "a plurality" for the present invention) convex parts 32a, 32b, and 32c (hereinafter, referred to simply as "convex parts 32" when no distinction is required) that support the locking member 5 that is energized by the spring 6 (both are shown in FIG. 1) are formed on the inner surface of the base plate 31 of the hub 21 so as to be positioned at equal intervals on a circle about an axis S (see FIG. 1) of the hub 21. When viewed from above, the convex parts 32 are formed so as to be arc-shaped with central angles of 30° about the axis S of the hub 21.

Figure 5:
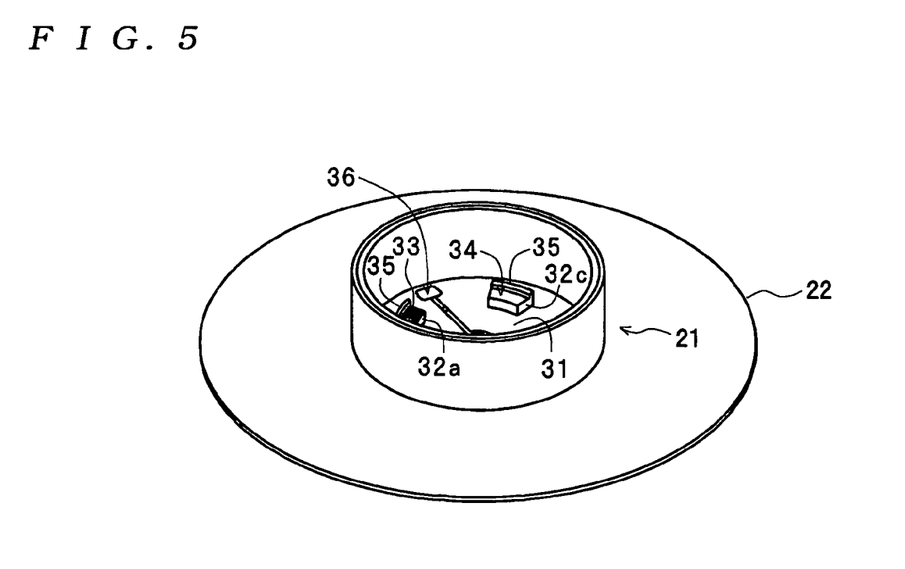
FIG. 5 is a perspective view of a hub and a lower flange.

Also, as shown in FIGS. 4 and 5, teeth 33 (that correspond to "second teeth" for the present invention), which have ridges 33a (see FIG. 10) radially formed about the axis S of the hub 21 and engage teeth 51a of the locking member 5, are formed on an upper part of the convex part 32a. That is, on the inner surface of the base plate 31, the teeth 33 are only formed in a fan-shaped region with a central angle of 30° (one example of "10 to 100° inclusive" for the present invention) about the axis S. Here, to maintain a sufficient strength so that rotation of the tape reel 3 can be reliably prevented, it is necessary to form at least two or three convexes (or concaves) in the teeth 33. For this reason, the central angle of the fan-shaped region described above where the teeth 33 are formed should preferably be 10° or above. On the other hand, the brake releasing plate 4 (see FIG. 1), which has three protrusions 41b formed so as to protrude at equal intervals (intervals of 120°) as described later, is disposed on the base plate 31 on the inside of the hub 21. This means that it is necessary to form the convex parts 32a, 32b, 32c at parts aside from the parts where the protrusions 41b will be positioned when the brake releasing plate 4 has been disposed, i.e., it is necessary to respectively form the convex parts 32a, 32b, 32c on the inner surface of the base plate 31 in three fan-shaped regions whose central angles about the axis S are 100° or less. That is, it is necessary for the fan-shaped region described above in which the teeth 33 are formed to have a central angle of 100° or less. By forming the teeth 33 in a fan-shaped region whose central angle is 100° or less, as described later, even if the tape reel 3 and the locking member 5 become displaced, the teeth 33 and the teeth 51a can still engage reliably. Accordingly, the teeth 33 should preferably be formed only in a fan-shaped region with a central angle of 10 to 100° about the axis S on the inner surface of the base plate 31.

Figure 8:
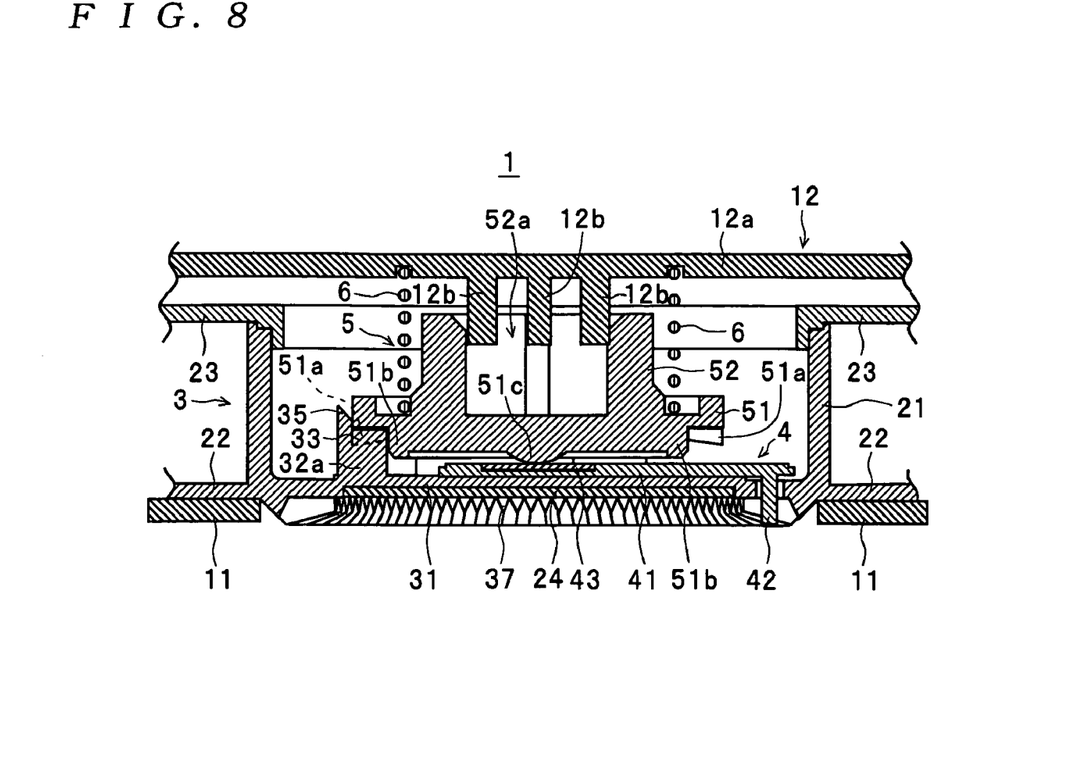
FIG. 8 is a cross-sectional view of the tape cartridge when not in use.

Flat contact surfaces 34 are formed on the upper parts of the convex parts 32b and 32c. In this case, the heights of the convex parts 32b and 32c are set so that in a state where the teeth 33 and the teeth 51a are in engagement, the respective edges of the teeth 51a contact the contact surfaces 34 without engaging and a main body 51 of the locking member 5 is placed in a state that is parallel (or substantially parallel) to the base plate 31 of the hub 21. Positioning parts 35 (corresponding to "first positioning parts" for the present invention) in the form of arc-shaped thin plates that protrude further toward the opening of the hub 21 than the edges of the teeth 33 are also formed on the respective convex parts 32 along the outer circumferential edges of the convex parts 32. Here, as shown in FIG. 8, the radius of curvature and the like of the positioning parts 35 are set so that in a state where the teeth 33 formed on the convex part 32a engage the teeth 51a of the locking member 5 and the edges of the respective teeth 51a contact the contact surfaces 34, the inner circumferential surfaces of the positioning parts 35 contact (or are proximate to) a side surface (an outer circumferential surface) on the outer circumference side of the locking member 5.

Figure 6:
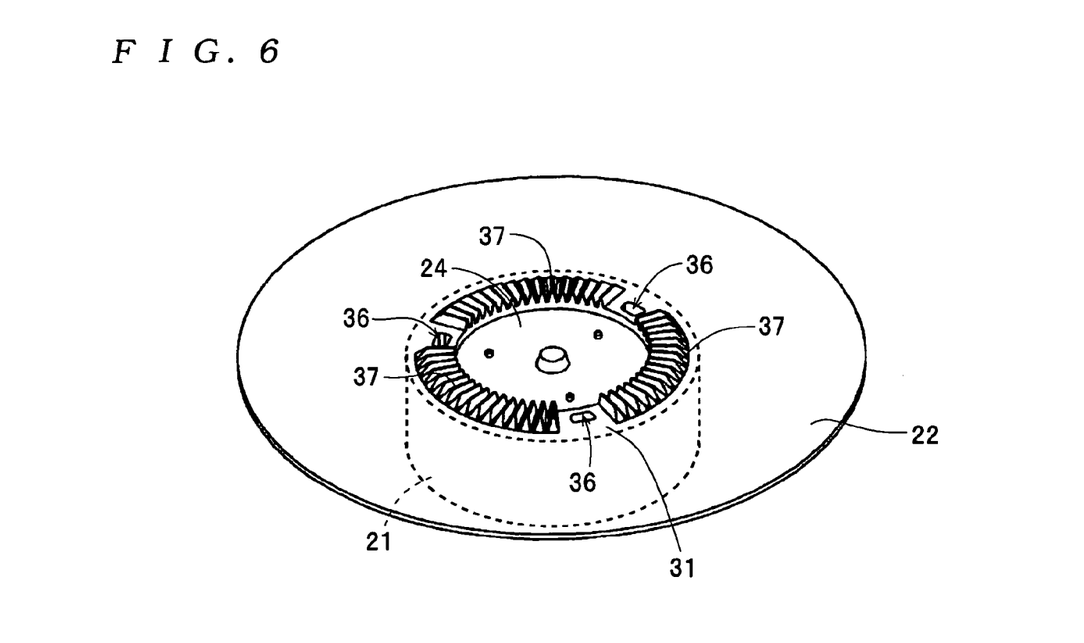
FIG. 6 is a perspective view of a hub and a lower flange.

As shown in FIG. 6, through holes 36 for attaching the brake releasing plate 4 (see FIG. 1) in a state where the brake releasing plate 4 can move up and down are formed in the base plate 31 of the hub 21 so as to be positioned on a circle about the axis S of the hub 21. As shown in FIG. 6, a metal plate 24 (see FIG. 1) for attaching the drive shaft of a drive apparatus and the hub 21 (the tape reel 3) by magnetic attraction is also attached to a central part of an outer surface of the base plate 31 of the hub 21. In addition, as shown in FIG. 6, ring-shaped teeth 37 that engage driving teeth (not shown) of the drive shaft of the drive apparatus are formed on the outer surface of the base plate 31 so as to surround the metal plate 24.

Figure 3:
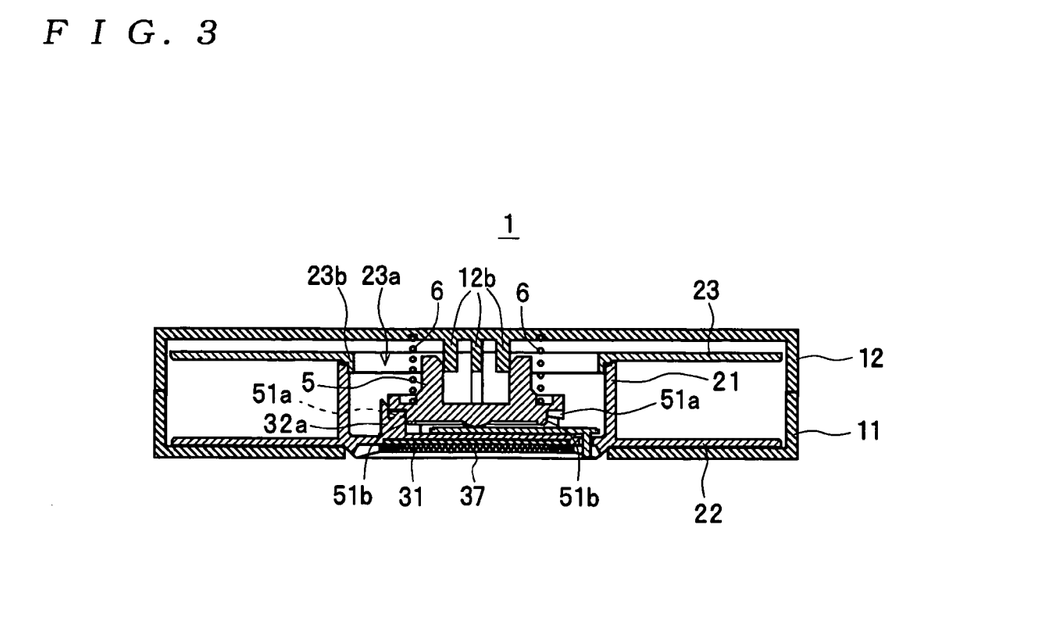
FIG. 3 is a cross-sectional view of the tape cartridge.

As shown in FIG. 5, the lower flange 22 is disc-like and is integrally formed at a lower end of the hub 21. As shown in FIGS. 1 and 3, the upper flange 23 is also disc-like, and is fixed to the hub 21 by ultrasonic welding, for example, in a state where a disc-like protrusion 23b formed at the rim of a circular center hole 23a has been fitted into the opening of the hub 21.

As shown in FIG. 1, the brake releasing plate 4 includes a main body 41a, three protrusions 41b formed at equal intervals so as to protrude outward from the main body 41a, three legs 42 that are erected on the rear surfaces (the lower surfaces in FIG. 1) of the protrusions 41b and are formed so as to be able to pass through the through holes 36 of the hub 21, and a circular metal plate 43 that is attached to the surface (the upper surface in FIG. 1) of the main body 41a. By inserting the legs 42 into the through holes 36 of the hub 21, the brake releasing plate 4 is disposed on the base plate 31 inside the hub 21 so as to be incapable of rotation relative to the hub 21 but capable of up-down movement.

Figure 7:
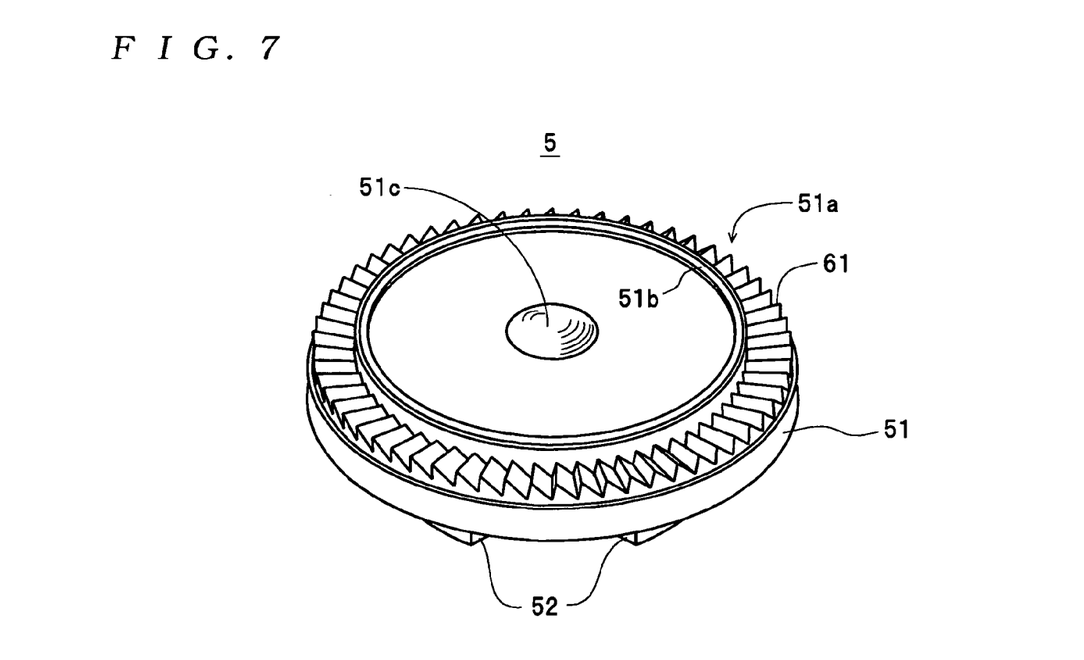
FIG. 7 is a perspective view of a locking member.

As shown in FIG. 1, the locking member 5 includes a main body 51 and a guide part 52 and is enclosed inside the case main body 2 (i.e., inside the hub 21). The main body 51 is disc-like and, as shown in FIG. 7, has ring-like teeth 51a (corresponding to "first teeth" for the present invention) with ridges 61 (see FIG. 10) that are radially formed about a central axis of the locking member 5. The teeth 51a can engage the teeth 33 of the hub 21 and are formed on the outer edge of the lower surface (the upper surface in FIG. 7) of the main body 51. A ring-shaped positioning part 51b (corresponding to a "second positioning part" for the present invention) is also formed on an inner circumference side of the teeth 51a on the main body 51. The protruding height of the positioning part 51b is set greater than the height of the teeth 51a. That is, as shown in FIG. 8, in a state where the teeth 33 of the hub 21 and the teeth 51a are in engagement, the positioning part 51b is set so as to protrude further toward the base plate 31 of the hub 21 than the edges of the teeth 51a. The outer diameter of the positioning part 51b is set so that the positioning part 51b contacts or is proximate to the inner circumferential surface (the side surface on the inner circumference side) of the convex parts 32 in a state where the teeth 33 and the teeth 51a engage. Also, as shown in FIGS. 7 and 8, a protrusion 51c for contacting the metal plate 43 of the brake releasing plate 4 during rotation of the tape reel 3 and reducing frictional resistance between the locking member 5 and the metal plate 43 is formed in the center of the base surface of the main body 51.

As shown in FIG. 1, the guide part 52 is formed so as to be shaped as a cross when viewed from above, and a guide groove 52a that is also shaped as a cross and into which the four guide protrusions 12b on the upper case 12 can be inserted is formed in the guide part 52. When the tape cartridge 1 is not in use, rotation of the locking member 5 is restricted by the guide protrusions 12b of the upper case 12 and the locking member 5 is energized by the spring 6 so that the teeth 51a are caused to engage the teeth 33 of the hub 21 and prevent the tape reel 3 from rotating.

As shown in FIG. 1, the spring 6 is composed of a coil spring, is disposed between the upper case 12 and the locking member 5, and energizes the locking member 5 toward the base plate 31 of the hub 21 of the tape reel 3. As shown in FIG. 1, the door member 7 is formed of a thin plate that can close the tape withdrawal opening 2a and is enclosed in guide channels respectively formed in the side wall 11c of the lower case 11 and the side wall 12c of the upper case 12 so as to be able to slide.

Next, the operation of the various component elements when the tape cartridge 1 is used will be described with reference to the drawings.

In a state where the tape cartridge 1 has been ejected from a drive apparatus, not shown, that is, when the tape cartridge 1 is not in use, as shown in FIG. 8, the locking member 5 is energized by the spring 6 and is moved toward the base plate 31 of the hub 21 while pressing the brake releasing plate 4. At this time, some of the teeth 51a of the locking member 5 engage the teeth 33 on the convex part 32a of the hub 21. Rotation of the locking member 5 is restricted by the guide protrusions 12b of the upper case 12 that are inserted into the guide groove 52a of the guide part 52. This means that rotation of the hub 21 (the tape reel 3) is prevented by the locking member 5 and the guide protrusions 12b. As a result, slackening of the magnetic tape (not shown) wound around the tape reel 3 is prevented. Also, in this state, as shown in FIG. 8, the positioning part 51b of the locking member 5 contacts the inner circumferential surfaces of the convex parts 32 (only the convex part 32a is shown in FIG. 8), and the positioning parts 35 of the convex parts 32 contact the outer circumferential side surface of the locking member 5. For this reason, movement of the hub 21 relative to the locking member 5 in a plane perpendicular to the axis S (shown in FIG. 1) of the hub 21 is restricted, and as a result, even if an external force is applied to the tape cartridge 1, for example, a state where the teeth 33 and the teeth 51a reliably engage one another can be maintained.

Figure 9:
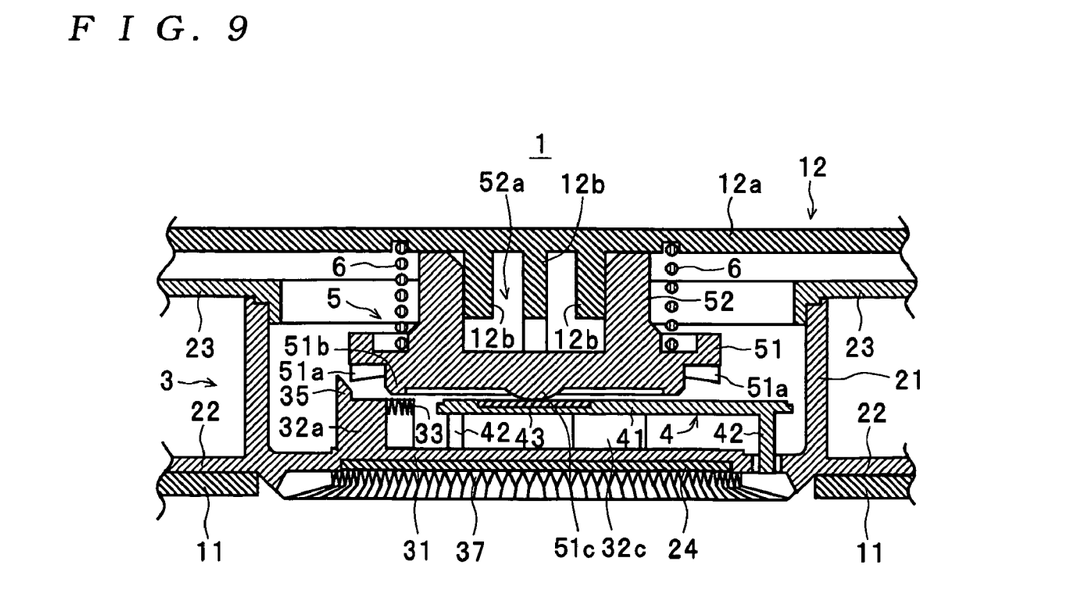
FIG. 9 is a cross-sectional view of the tape cartridge during use.

On the other hand, when the tape cartridge 1 is loaded into a loading unit of a drive apparatus, the door member 7 is slid by the drive apparatus to open the tape withdrawal opening 2a. Next, the loading unit moves the tape cartridge 1 toward the front end of the driving shaft inside the drive apparatus, so that as shown in FIG. 9, the legs 42 of the brake releasing plate 4 are pressed by the drive shaft (not shown). As a result, the locking member 5 is pressed in toward the top plate 12a of the upper case 12 by the brake releasing plate 4 while being guided by the guide protrusions 12b of the upper case 12. In this state, the engagement of the teeth 51a of the locking member 5 and the teeth 33 of the hub 21 is released, and the contact between the positioning part 51b of the locking member 5 and the inner circumferential surfaces of the convex parts 32 and the contact between the positioning parts 35 of the hub 21 and the outer circumferential surface of the locking member 5 are respectively released. Also, the driving teeth (not shown) disposed on the front end of the drive shaft and the teeth 37 of the hub 21 engage and the metal plate 24 of the tape reel 3 is attached to the front end of the drive shaft by magnetic attraction, thereby chucking the drive shaft and the tape reel 3.

Next, the drive apparatus pulls the magnetic tape wound around the tape reel 3 out of the case main body 2 from the tape withdrawal opening 2a. While a tape reel inside the drive apparatus winds the magnetic tape, the drive shaft of the drive apparatus rotates at a rotational velocity in accordance with the withdrawal velocity of the magnetic tape and thereby rotates the tape reel 3. Next, a recording/reproduction unit of the drive apparatus carries out the recording of recording data on the magnetic tape or the reading of recording data from the magnetic tape. After this, once the recording and/or reading of recording data has ended, the drive shaft rotates in a rewinding direction for the magnetic tape, thereby rewinding the magnetic tape onto the tape reel 3.

Figure 10:
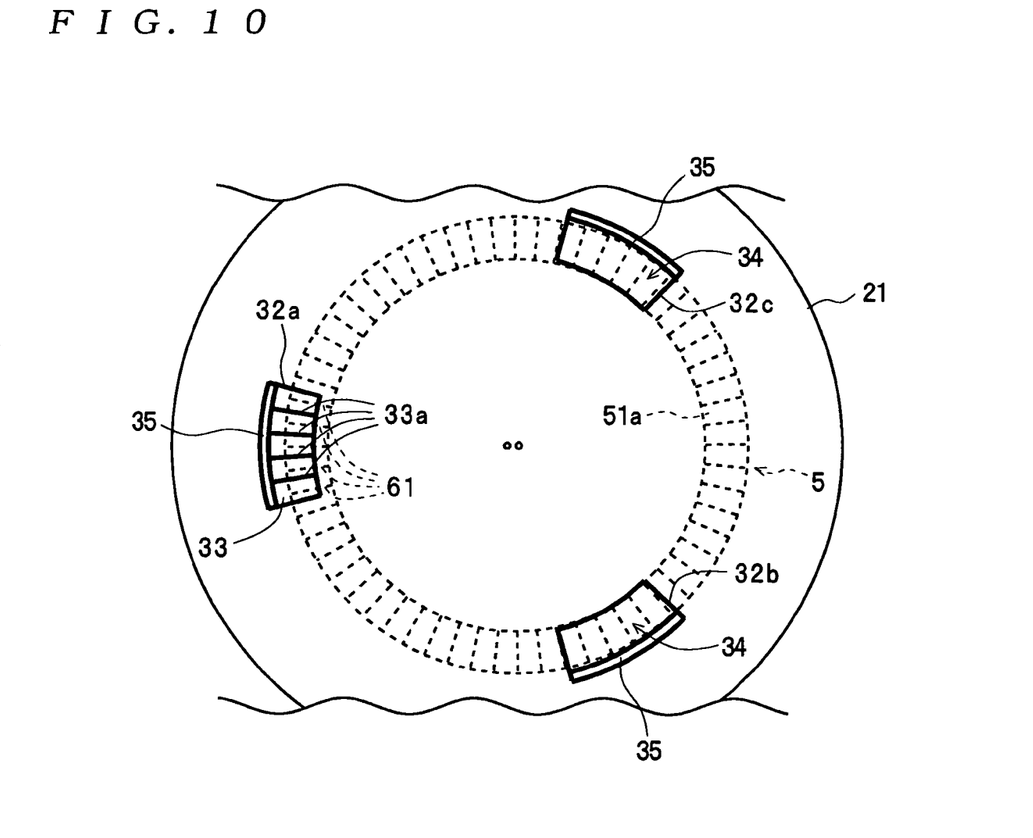
FIG. 10 is a plan view of the locking member and the hub in a state where the locking member and the hub are relatively displaced.

Next, when the winding of the magnetic tape has ended, the loading unit withdraws the front end of the drive shaft from the tape cartridge 1. In this case, the locking member 5 energized by the spring 6 presses the brake releasing plate 4 while being moved toward the base plate 31 of the hub 21. In this case, teeth 33 are formed on only the upper part of the convex part 32a out of the convex parts 32a, 32b, and 32c. That is, the teeth 33 are formed in only a fan-shaped region with a central angle of 30° about the axis S on the inner surface of the base plate 31. This means that as shown in FIG. 10, even if the hub 21 (the tape reel 3) and the locking member 5 become somewhat displaced (misaligned), the orientations of all of the ridges 33a of the teeth 33 will still be substantially equal to the orientations of the ridges 61 of the teeth 51a that face the respective ridges 33a. Accordingly, as shown in FIG. 8, the teeth 51a of the locking member 5 are caused to reliably engage the teeth 33 of the hub 21 by movement of the locking member 5. In this state, the edges of the teeth 51a contact the contact surfaces 34 formed on the upper parts of the convex parts 32b and 32c, so that as shown in FIG. 8, the locking member 5 is supported by the convex parts 32a, 32b, and 32c so that the main body 51 becomes parallel (or substantially parallel) to the base plate 31 of the hub 21. As a result, unlike a conventional tape cartridge, rotation of the hub 21 (the tape reel 3) is reliably prevented, and therefore slackening of the magnetic tape wound around the tape reel 3 is reliably prevented. In this state, as shown in FIG. 8, the outer circumferential surface of the positioning part 51b of the locking member 5 contacts the inner circumferential surfaces of the respective convex parts 32 of the hub 21 and the outer circumferential surface of the main body 51 of the locking member 5 contacts the inner circumferential surfaces of the positioning parts 35 of the hub 21. For this reason, in the same way as in the state where the tape cartridge 1 is not used, movement of the hub 21 relative to the locking member 5 in a plane perpendicular to the axis S of the hub 21 is restricted, and as a result, even if an external force is applied to the tape cartridge 1, the state where the teeth 33 and the teeth 51a reliably engage one another is maintained.

In this way, according to the tape cartridge 1, the teeth 33 are formed on only the convex part 32a out of the convex parts 32a, 32b, 32c disposed on a circle about the axis S on the inner surface of the base plate 31 of the hub 21 and the contact surfaces 34 that contact the edges of the teeth 51a of the locking member 5 without engaging are formed on the upper parts of the convex parts 32b and 32c. This means that even if the hub 21 and the locking member 5 become somewhat displaced when the locking member 5 is moved toward the base plate 31 of the hub 21, unlike a conventional magnetic tape cartridge, the orientations of all of the ridges 33a of the teeth 33 of the hub 21 can be made substantially equal to the orientations of the ridges 61 of the teeth 51a of the locking member 5 that face the respective ridges 33a. Accordingly, since the teeth 33 of the hub 21 can reliably engage the teeth 51a, rotation of the tape reel 3 can be reliably prevented.

By forming the teeth 33 in only a fan-shaped region with a central angle of 30° (one example of an angle of 10 to 100°, inclusive) about the axis S on the inner surface of the base plate 31, it is possible to form a sufficient number of tops in the teeth 33, and therefore teeth 33 for reliably engaging the teeth 51a can be constructed with sufficient strength.

Also, by forming the positioning parts 35 on the respective convex parts 32 of the hub 21 and also forming the positioning part 51b on the locking member 5, it is possible to reliably restrict movement of the hub 21 relative to the locking member 5 in a plane perpendicular to the axis S of the hub 21. This means that even if an external force is applied to the tape cartridge 1 when the tape cartridge 1 is not in use, for example, the state where the teeth 33 and the teeth 51a reliably engage one another can be maintained.

Figure 11:
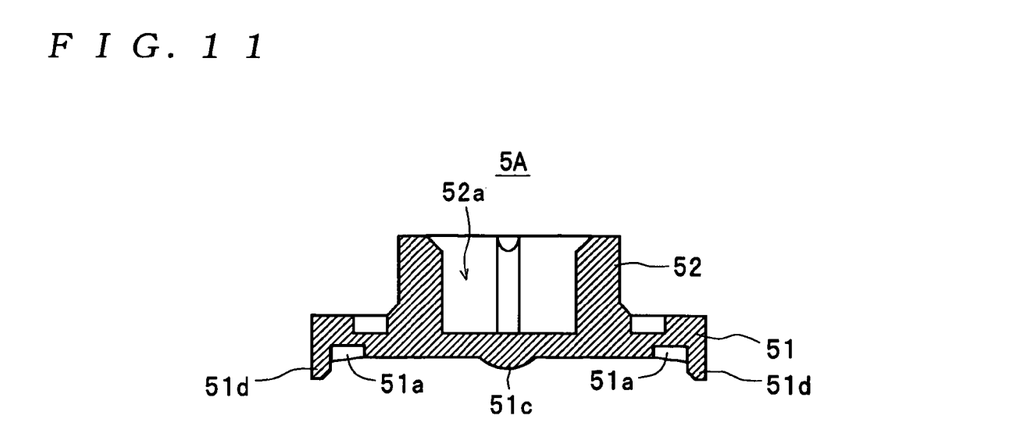
FIG. 11 is a cross-sectional view of another locking member.
Figure 12:
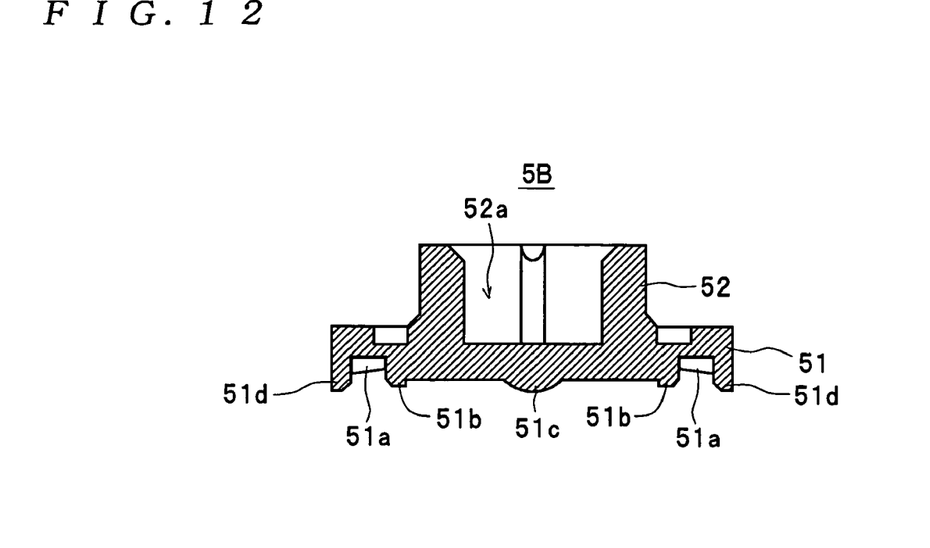
FIG. 12 is a cross-sectional view of yet another locking member.

It should be noted that the present invention is not limited to the above construction. For example, although the hub 21 equipped with three convex parts 32 has been described as an example, the number of convex parts for the present invention is not limited to this and can be change to any freely chosen number of two or more. In this case, the number of convex parts on which the teeth 33 are formed and the number of convex parts on which the contact surfaces 34 are formed can be freely set at any freely chosen numbers of one or more. Also, although an example where the teeth 33 have been formed on the convex part 32a whose central angle is set at 30° has been described, the central angle of the convex part 32a, that is, the central angle of the fan-shaped region in which the teeth 33 are formed can be freely changed in a range of 10 to 100°, inclusive. In this case, a plurality of convex parts may be disposed in a fan-shaped region whose central angle is set in the range of 10 to 100°, inclusive, with the teeth 33 being formed on such convex parts. Also, although an example where the positioning parts 35 are formed along the outer circumferential edges of the convex parts 32 has been described above, it is possible to provide a concave part inside the teeth 51a of the locking member 5 and to form positioning parts that contact the inner circumferential surface of the concave part (a surface on an "inner circumferential side of the first teeth" for the present invention) along the inner circumferential edges of the convex parts 32. In this case, it is possible to use convex parts including both positioning parts formed along the inner circumferential sides of the convex parts 32 and the positioning parts 35 described above. Also, although an example where the positioning part 51b has been formed on the inner circumferential side of the teeth 51a of the locking member 5 has been described above, as shown in FIG. 11, it is possible to use a locking member 5A where a ring-like positioning part 51d (corresponding to the "second positioning part" for the present invention) has been formed along the outer circumferential edge of the teeth 51a (the "first teeth" for the present invention). It should be noted that in FIG. 11 and in FIG. 12, component elements that have the same functions as the component elements of the locking member 5 described above have been assigned the same reference numerals and description thereof has been omitted. Here, as shown in FIG. 12, it is also possible to use a locking member 5B where the positioning part 51b is formed on the inner circumferential side of the teeth 51a and the positioning part 51d is formed on the outer circumferential side of the teeth 51a.

What is claimed is:

1. A cartridge case comprising:
   a case main body;
   a tape reel that includes a hub in the shape of a bottomed-cylinder and is rotatably enclosed inside the case main body; and
   a locking member on whose base part ring-shaped first teeth are formed, which is energized toward an inner surface of a base plate of the hub, is enclosed within the case main body so as to be capable of moving in a direction toward and away from the base plate, and restricts rotation of the tape reel when energized toward the base plate,
   wherein the tape reel includes a plurality of arc-shaped convex parts that are disposed on a circle about an axis of the hub on the inner surface of the base plate and support the locking member that has moved toward the base plate,
   second teeth that engage the first teeth are formed on an upper part of at least one of the convex parts, and
   a contact surface that contacts edges of the first teeth without engaging the first teeth is formed on an upper part of at least one of the convex parts.

2. A cartridge case according to claim 1,
   wherein the at least one convex parts on which the second teeth are formed are disposed only in a fan-shaped region on the inner surface of the base plate with a central angle of 10 to 100° inclusive about an axis of the hub.

3. A cartridge case according to claim 1,
   wherein the tape reel further comprises first positioning parts that are formed along edges on at least one of outer circumferential sides and inner circumferential sides of the convex parts so as to protrude further than edges of the second teeth, wherein in a state where the first teeth and the second teeth are in engagement, side surfaces of the first positioning parts contact or are proximate to a side surface on one of an outer circumferential side and an inner circumferential side of the first teeth and position the tape reel and the locking member.

4. A cartridge case according to claim 1,
   wherein the locking member includes a second positioning part that is formed along an edge on at least one of an outer circumferential side and an inner circumferential side of the first teeth so as to protrude further than edges of the first teeth, wherein in a state where the first teeth and the second teeth are in engagement, a side surface of the second positioning part contacts or is proximate to side surfaces of the convex parts to position the tape reel and the locking member.

5. An information recording medium comprising a cartridge case according to claim 1.

6. An information recording medium comprising a cartridge case according to claim 2.

7. An information recording medium comprising a cartridge case according to claim 3.

8. An information recording medium comprising a cartridge case according to claim 4.

* * * * *